(12) United States Patent
Takakura et al.

(10) Patent No.: US 8,690,240 B2
(45) Date of Patent: Apr. 8, 2014

(54) PROTECTION MEMBER FOR COUPLING DEVICE

(75) Inventors: Shinji Takakura, Koga (JP); Takeharu Nakano, Tokyo (JP); Takehiro Togami, Tokyo (JP)

(73) Assignee: Sekisui Plastics Co., Ltd., Osaka-shi (JP)

( * ) Notice: Subject to any disclaimer, the term of this patent is extended or adjusted under 35 U.S.C. 154(b) by 0 days.

(21) Appl. No.: 13/388,356

(22) PCT Filed: Aug. 5, 2010

(86) PCT No.: PCT/JP2010/063320
§ 371 (c)(1),
(2), (4) Date: Feb. 1, 2012

(87) PCT Pub. No.: WO2011/016532
PCT Pub. Date: Feb. 10, 2011

(65) Prior Publication Data
US 2012/0126606 A1 May 24, 2012

(30) Foreign Application Priority Data

Aug. 6, 2009 (JP) .................................. 2009-183380

(51) Int. Cl.
*A47C 31/02* (2006.01)
(52) U.S. Cl.
USPC .................. 297/218.1; 297/218.3; 297/218.5
(58) Field of Classification Search
USPC ........... 297/218.1, 218.2, 218.3, 218.4, 218.5
See application file for complete search history.

(56) References Cited

U.S. PATENT DOCUMENTS

2005/0081353 A1* 4/2005 Law ...................... 297/218.4 X

FOREIGN PATENT DOCUMENTS

| CN | 1640714 A | 7/2005 |
|---|---|---|
| JP | 58-181621 A | 10/1983 |
| JP | 59-68451 U | 5/1984 |
| JP | 4-95753 U | 8/1992 |
| JP | 6-19603 U | 3/1994 |
| JP | 3729238 B2 | 7/2000 |
| JP | 2002-034706 A | 2/2002 |
| JP | 2002-177100 A | 6/2002 |
| JP | 2005-000418 A | 1/2005 |

OTHER PUBLICATIONS

International Search Report dated Oct. 19, 2010, issued for PCT/JP2010/063320.
Office Action dated Apr. 30, 2013, issued for the corresponding Korean Application No. 10-2011-7027590.

* cited by examiner

*Primary Examiner* — Rodney B White
(74) *Attorney, Agent, or Firm* — Edwards Wildman Palmer LLP

(57) ABSTRACT

An object is to provide a coupling device protection member that can prevent contact between a cushion material and a coupling device to protect the coupling device. A coupling device protection member is used in a vehicle seat that includes a cushion material that is elastically deformed by loads, a frame member that is stacked to the cushion material to reinforce the cushion material, and a surface cover that covers at least the cushion material, the surface cover being coupled to the frame member via a coupling device, in which the coupling device protection member is attached to the frame material so as to protect the coupling device coupled to the frame member.

13 Claims, 12 Drawing Sheets

PROTECTION MEMBER FOR COUPLING DEVICE

FIELD OF THE INVENTION

The present invention relates to a protection member for a coupling device (a coupling device protection member) that protects a coupling device provided on a surface cover of a vehicle seat.

RELATED ART

The following Patent Document 1 discloses an example of a vehicle seat that is installed inside a vehicle (e.g., an automobile). Specifically, the vehicle seat includes a cushion material (a pad made of foam) that is elastically deformed by loads (e.g., weight of a passenger), a frame member (a frame body) that reinforces the cushion material, and a surface cover (a trim cover) that covers at least the cushion material.

The cushion material is a foamed resin molding of a thermo-setting resin, such as polyurethane foam, and is formed by using a molding die. Specifically, a material, namely polyurethane foam in liquid form is injected into a molding cavity inside a molding die, and is foamed into a molding to foam a cushion material that is elastically deformed upon application of loads.

The surface cover with covering the cushion material is configured to have its end portion coupled to a frame member. Specifically, the end portion of the surface cover is provided with a coupling device (a locking projection) that is configured to be able to be coupled to the frame member, and the coupling device is coupled to the frame member in proximity to a periphery of the cushion material (c.f., Patent Document 2).

PRIOR ART DOCUMENTS

Patent Documents
Patent Document 1: Japanese Patent No. 3729238
Patent Document 2: Japanese Patent Application Laid-open No. Sho-58-181621

DISCLOSURE OF THE INVENTION

Problems to be Solved by the Invention

However, the vehicle seat as described above, which has a coupling position between the frame member and the coupling device located in proximity to the cushion material, may cause the cushion material to contact the coupling device when the cushion material has been elastically deformed upon application of loads. In this case, loads applied to the cushion material transfer to the coupling device, which may results in breakage of the coupling device or disengagement of the coupling device from the frame member.

In consideration of the above, it is an object of the present invention to provide a protection member for a coupling device (a coupling device protection member) that is capable of preventing contact between a cushion material and a coupling device, thereby protecting the coupling device.

Means for Solving Problems

According to the present invention, there is provided a coupling device protection member for use in a vehicle seat that includes a cushion material that is elastically deformed by loads, a frame member that is stacked to the cushion material to reinforce the cushion material, and a surface cover that covers at least the cushion material, the surface cover being coupled to the frame member via a coupling device, wherein the coupling device protection member is attached to the frame material so as to protect the coupling device coupled to the frame member.

According to the above configuration, the coupling device coupled to the frame member is protected by the coupling device protection member that is attached to the frame member. Thus, it is possible to prevent or reduce occurrence of breakage of the coupling device due to contact of the cushion material to the coupling device or disengagement of the coupling device from the frame member.

Specifically, since the cushion material and the frame member are arranged in stacked fashion, the coupling device is necessarily held in contact with the cushion material when the coupling device has been coupled to the frame member. Because of this, the cushion material, which has been elastically deformed by loads, causes loads to be applied onto the coupling device, which may cause breakage of the coupling device or disengagement of the coupling device from the frame member. However, attaching the coupling device protection member to the frame member can prevent breakage or disengagement of the coupling device.

The coupling device protection member of the present invention preferably includes a protection portion that covers at least one of coupling devices attached to the frame member at plural positions, and an attaching portion that is attached to the frame member.

According to the above configuration, even when the plural coupling devices are coupled to the frame member, it is possible to prevent or reduce occurrence of breakage of the coupling devices due to contact of the cushion material to the coupling devices, or disengagement of the coupling devices from the frame member. Specifically, since the surface cover is coupled to the frame member generally at plural positions, the coupling devices are coupled to the frame member at plural positions. By providing the protection portion that covers at least one coupling device, it is possible to prevent breakage or disengagement of at least one coupling device.

In the coupling device protection member of the present invention, it is preferable to employ a configuration, in which the protection portion is formed to cover at least one of the coupling devices coupled to the frame member from at least two sides, the attaching portion is provided in plural to locate the at least one of the coupling devices covered by the protection portion between the attaching portions, in which the protection portion and the plural attaching portions are formed integrally with each other.

According to the above configuration, by covering the coupling device by the protection portion from at least two sides, it is possible to more securely prevent contact between the cushion material and the coupling device. Also, with providing plural attaching portions, the protection member can be more securely held attached to the frame member.

The coupling device protection member is preferably formed of a foamed resin molding that has a higher compression strength than that of the cushion material.

According to the above configuration with the coupling device protection member formed of a foamed resin molding, the coupling device protection member is unlikely to be broken even when the cushion material is deformed and contacts the coupling device protection member, and thus the coupling device can be kept in covered state. Loads applied onto the cushion material can be supported by the coupling device protection member, too.

The coupling device protection member of the present invention is preferably coated with a material that has slidability.

According to the above configuration with the coupling device protection member coated with a material having slidability, it is possible to reduce friction caused at the time when the protection member contacts a body of a vehicle or the frame member and is in friction therewith. Whereby, the protection member can be prevented or suppressed from being broken due to friction. It is also possible to prevent abnormal noises caused due to contact and friction with a body of a vehicle or the frame member.

The coupling device protection member of the present invention is preferably configured to be releasable from a state in which the coupling device protection member is held attached to the frame member.

According to the above configuration with the coupling device protection member configured to be releasable from a state in which the coupling device protection member is held attached to the frame member, the coupling device protection member can be easily separated from the frame member when the formed vehicle seat is to be disposed of, and therefore separation collection for each part or member can be easily made.

The vehicle seat preferably includes a plurality of frame members.

A vehicle seat of the present invention includes: a cushion material that is elastically deformed by loads; a frame member that is stacked to the cushion material to reinforce the cushion material; a surface cover that covers at least the cushion material, the surface cover being coupled to the frame member via a coupling device, and at least one of the aforesaid coupling device protection members.

In the vehicle seat of the present invention, any one of the aforesaid coupling device protection members is preferably fixed to the frame member.

Advantages of the Invention

As described above, according to the present invention, it is possible to protect the coupling device against contact with the cushion material.

DETAILED DESCRIPTION OF THE PREFERRED EMBODIMENTS

<First Embodiment>

Now, the description will be made for a first embodiment of the present invention with reference to FIGS. 1 to 6.

Figure 1:
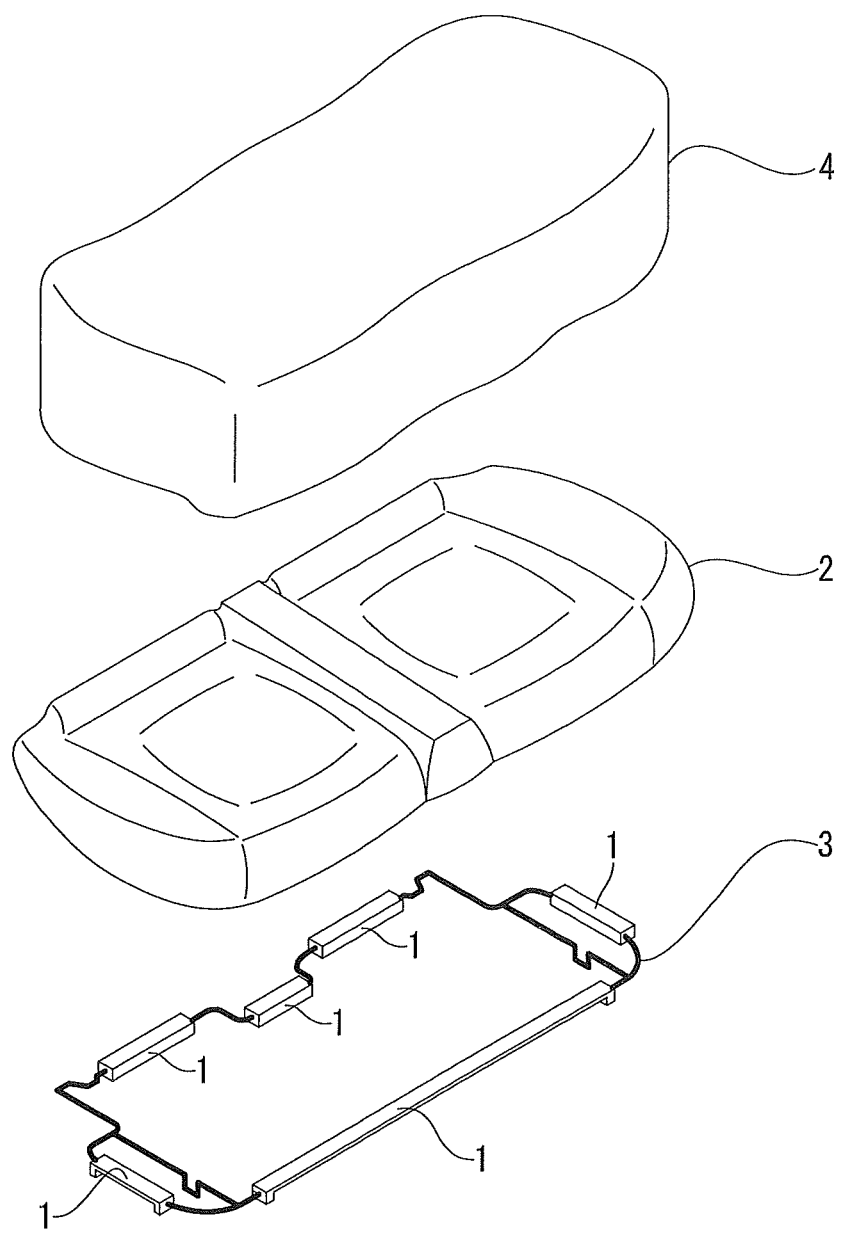
FIG. 1 is a perspective view showing a construction of a vehicle seat using a coupling device protection member of a first embodiment.
Figure 2:
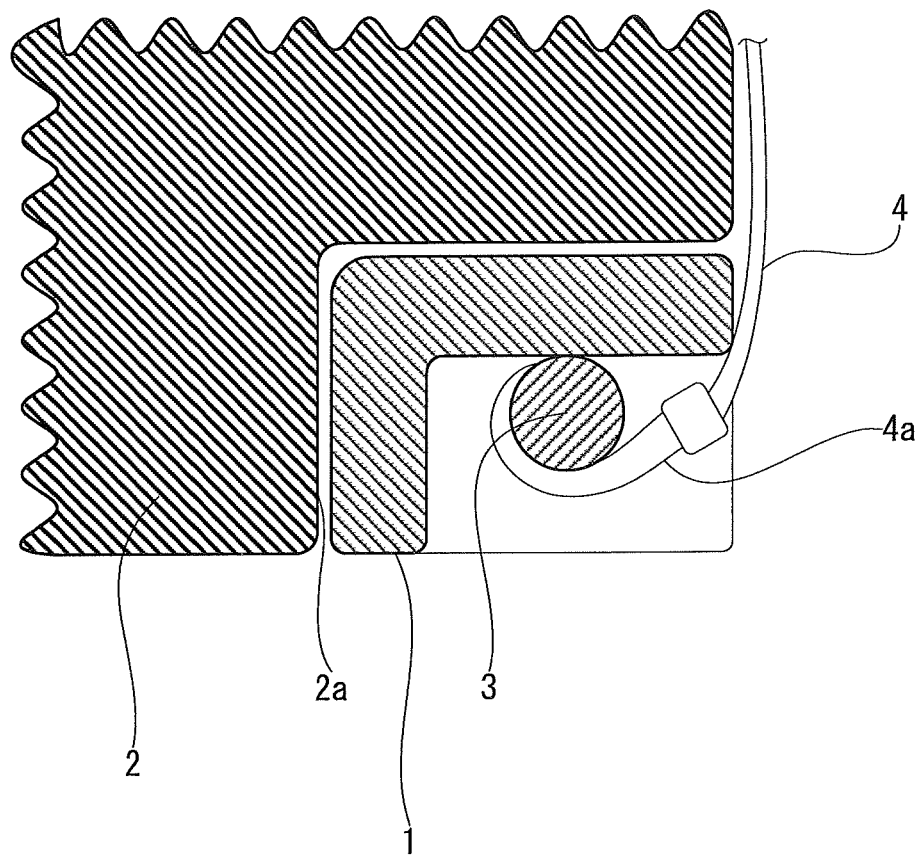
FIG. 2 is a cross sectional view of a peripheral portion of the coupling device protection member in a vehicle seat using the coupling device protection member of the first embodiment.

A coupling device protection member (hereinafter referred to a protection member) 1 according to this embodiment is used as a member that constitutes a vehicle seat for use by being installed inside a vehicle (e.g., an automobile). As shown in FIGS. 1 and 2, the vehicle seat includes a cushion material 2 that is elastically deformed due to loads (e.g., a weight of a passenger), a frame member 3 that is stacked to the cushion material 2 to reinforce the cushion material 2, and a surface cover 4 that covers at least the cushion material 2 and is coupled to the frame member 3 via a coupling device 4*a*. The protection member 1 is attached to the frame member 3. By an upper side is hereinafter meant a side which a passenger contacts when referred in association with the vehicle seat. By a lower side is hereinafter meant a side which is located opposite to the upper side when referred in association with the vehicle seat. The lower side herein is a side facing a floor of a vehicle when the seat has been installed therein.

The cushion material 2 is configured to be elastically deformed by loads. For a material of the cushion material 2, it is preferable to use a foamed resin molding of a thermosetting resin. For example, it is preferable to use a polyurethane foam which is formed by using a polyurethane resin. In this embodiment, the cushion material 2 is used for a rear seat of an automobile, and has a lengthwise axis extending in one direction in plan view (when viewed from the upper side or lower side).

As shown in FIG. 2, the cushion material 2 includes a protection member disposing portion 2*a*, in which the protection member 1 attached to the frame member 3 is disposed in a formed vehicle seat. The protection member disposing portion 2*a* is formed in a periphery of the cushion material 2 in plan view. Specifically, the protection member disposing portion 2*a* is formed in a periphery of the cushion material 2 on its lower side, and is configured to be able to accommodate the protection member 1. In this embodiment, the protection member disposing portion 2*a* is formed in a peripheral direction of the cushion material 2 in plan view to have a peripheral portion of the cushion material 2 on its lower side formed into an L-shape in cross section. Whereby, the cushion material 2 and the frame member 3 are fixed together via the protection member 1 and hence the cushion material 2 and the frame member 3 are held in stacked relationship with each other.

Figure 3:
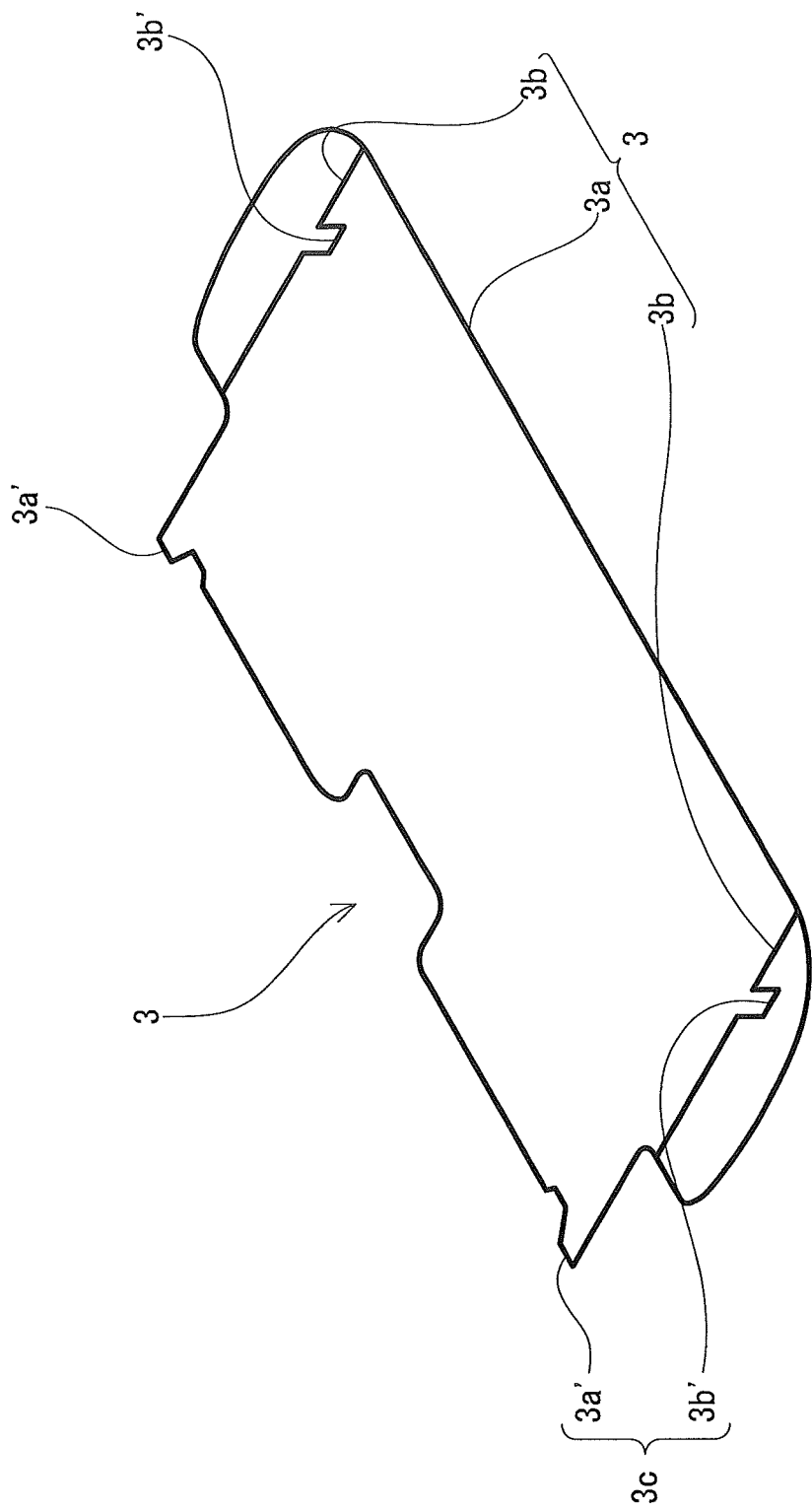
FIG. 3 is a perspective view showing a frame member, to which the coupling device protection member of the first embodiment is attached.

The frame member 3 is disposed on (stacked to) the cushion material 2 along the outer circumferential portion thereof in plan view, and is configured to reinforce the cushion material 2 of the formed vehicle seat. Specifically, the frame member 3 has a shape in plan view corresponding to the peripheral shape of the cushion material 2 in plan view. In this embodiment, as shown in FIG. 3, the frame member 3 is formed by using a wire-shape material (hereinafter referred to a wire material), and is formed into an annular shape along the peripheral shape of the cushion material 2 in plan view. The frame member 3 is configured to enable the surface cover 4 to be attached thereto upon coupling of the coupling device 4a. The coupling position between the frame member 3 and the coupling device 4a is located on the lower side of (below) the cushion material 2. The frame member 3 includes a peripheral frame 3a that is formed into an annular shape along the peripheral shape of the cushion material 2, and a transverse frame 3b that extends across an inner area of the peripheral frame 3a. In this embodiment, the coupling device 4a is coupled to the peripheral frame 3a, and the peripheral frame 3a is formed to have its coupling position with the coupling device 4a located on the lower side of (below) the cushion material 2. The wire material of the frame member 3 is preferably formed by using a material (e.g., a metal material) having higher stiffness than the cushion material 2.

The frame member 3 includes frame coupling portions 3c that are configured to be able to be coupled to a floor inside the vehicle (a floor panel). The frame coupling portions 3c are formed by bending portions of the wire material of the frame member 3. In this embodiment, the frame coupling portions 3c are provide at four positions of the frame member 3. Specifically, the frame coupling portions 3c include a pair of outer coupling portions 3a' that are formed by bending portions of the peripheral frame 3a to project them outward (toward the outer side away from the center of the inner area of the peripheral frame 3a), and coupling projections 3b' that are formed to have portions of the transverse frame 3b projecting from the inner area of the peripheral frame 3a, that is, projecting in a direction substantially perpendicular to the projecting direction of the outer coupling portions 3a'.

The outer coupling portions 3a' are located on the rear side of the vehicle with the vehicle seat installed in the vehicle, and project rearward. The coupling projections 3b' are configured to project downward with the vehicle seat installed in the vehicle.

Figure 4:
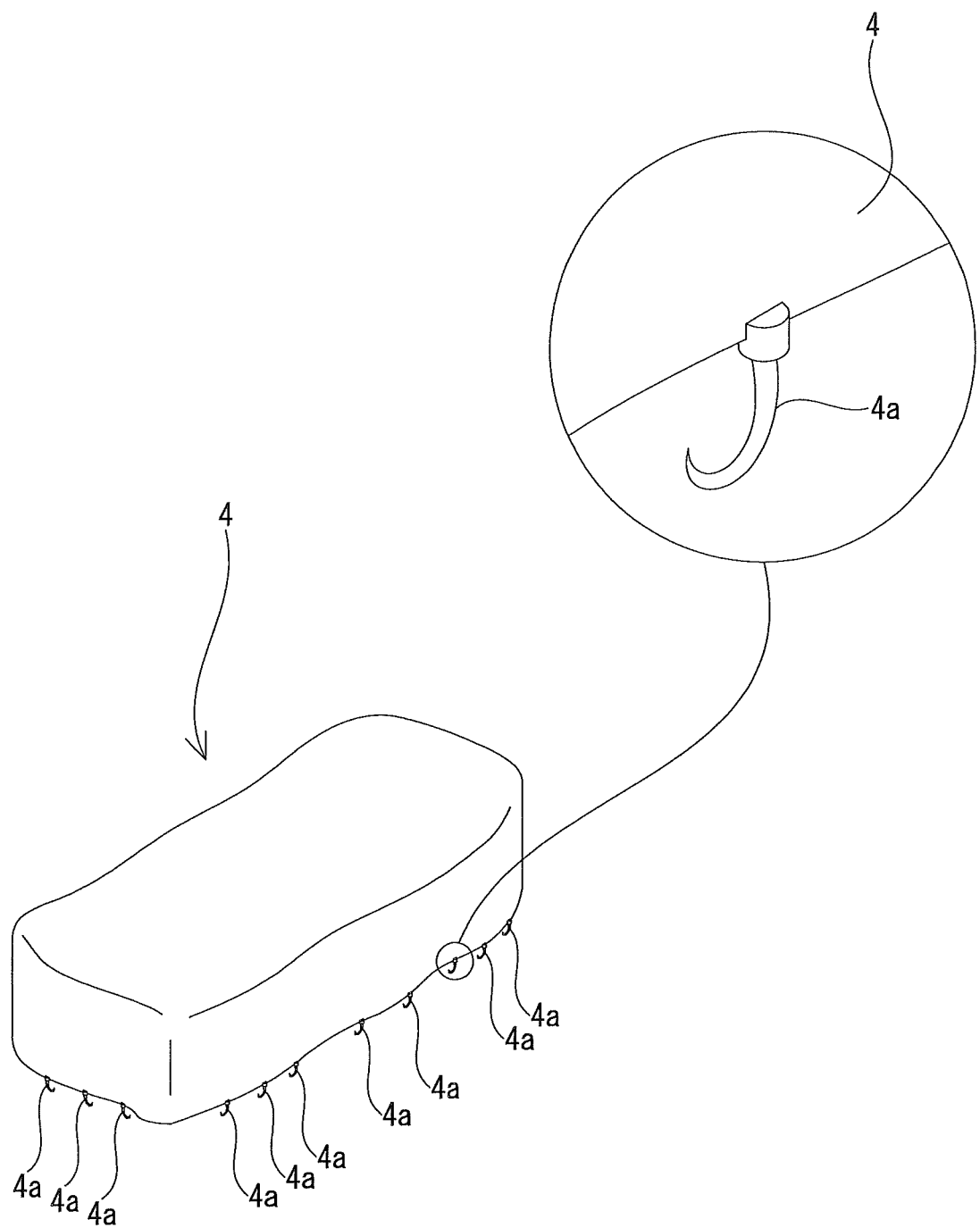
FIG. 4 is a perspective view showing a surface cover of the first embodiment.

The surface cover 4 is formed by using a fabric material and is configured to cover at least the cushion material 2. Specifically, as shown in FIG. 4, the surface cover 4 has a bag shape and is formed to allow the cushion material 2 to be placed inside the surface cover 4 through an opening. The surface cover 4 is configured to be able to be coupled to the frame member 3. Specifically, the surface cover 4 includes the coupling device 4a that is configured to be able to be coupled to the frame member 3. The coupling device 4a is provided at an end portion defining the opening of the surface cover 4, and is configured to be coupled to the frame member 3 with the surface cover 4 covering the cushion material 2.

The coupling device 4a is configured to be attachable to and detachable from the peripheral frame 3a. In this embodiment, the coupling device 4a has a hook shape corresponding to the wire material of the frame member 3 (peripheral frame 3a), and is configured to be attached to the peripheral frame 3a.

The coupling device 4a is provided in plural along the end portion of the surface cover 4. Positions at which the coupling devices 4a are attached are not limited and the coupling devices 4a are preferably provide at predetermined positions along the entire circumference of the end portion defining the opening of the surface cover 4. The surface cover 4 is coupled to the frame member 3 by the coupling devices 4a to allow the cushion material 2 to be fixed to the frame member 3.

Figure 5A:
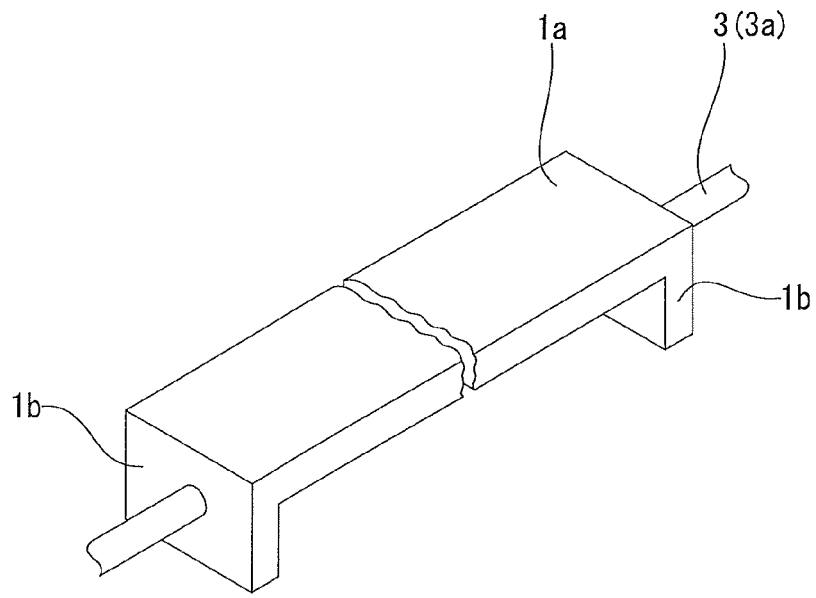
FIG. 5(*a*) is a perspective view showing the coupling device protection member of the first embodiment, and FIG. 5(*b*) is a cross sectional view of a peripheral portion of the coupling device protection member in a vehicle seat using the coupling device protection member of the first embodiment.

The protection member 1 is to be attached to the frame member 3 to protect the coupling device 4a. The protection member 1 is configured to be releasable from a sate in which the protection member 1 is held attached to the frame member 3. Specifically, as shown in FIG. 5(a), the protection member 1 includes a protection portion 1a that is formed to cover the coupling position of the frame member 3 to the coupling device 4a and an attaching portion 1b that is to be attached to the frame member 3, and is configured so that at least one of the coupling devices 4a is covered by the protection portion 1a in the formed vehicle seat.

The protection portion 1a and the attaching portion 1b of the protection member 1 are integrally formed together. Specifically, the protection member 1 is constituted by a foamed resin molding that is formed by foam resin particles injected into a molding cavity inside a mold and foamed therein. More specifically, the protection member 1 is formed by spraying high temperature steam into a molding cavity with foam resin particles filled therein, thereby heating and expanding the foam resin particles, while melting the surfaces of the foam resin particles to integrate them together.

The protection member 1 is preferably formed of a foamed resin molding that has a higher compression strength than that of the cushion material 2. Specifically, the protection member 1 is preferably formed of a foamed resin molding that is formed by using foam resin particles formed from a thermoplastic resin. Specifically, it is possible to use a pre-foamed resin formed by heating resin particles of a thermoplastic resin, which contains a foaming agent, with steam or the like. Although no limitation is intended, examples of the thermoplastic resin include a polystyrene-based resin, polyolefin-based resin (e.g., a polypropylene-based resin and a polyethylene-based resin), or a composite resin containing these resins. It is possible to use, for example, a polyester-based resins (e.g., polyethylene terephthalate, polybutylene terephthalate and polyethylene naphthalate), a polycarbonate-based resin and a polylactic-based resin. Especially, it is preferable to use a composite resin containing a polystyrene-based resin and a polyethylene-based resin.

The protection member 1 is preferably coated with a material having slidability. Examples of a material having slidability include a plastic material and unwoven fabric. The protection member 1 is coated preferably on a surface contacting another element or member, and may be entirely coated.

In this embodiment, the protection member 1 is configured to be fixed to the frame member 3. Specifically, when the protection member 1 is molded in a mold cavity, a portion of the frame member 3 is disposed within the mold cavity in molding, the protection member 1 with the portion of the frame member 3 embedded therein can be produced. Whereby, the protection member 1 is fixed to the frame member 3 at a portion (the attaching portion 1b hereinafter described), at which the frame member 3 is embedded in the protection member 1.

Figure 5B:
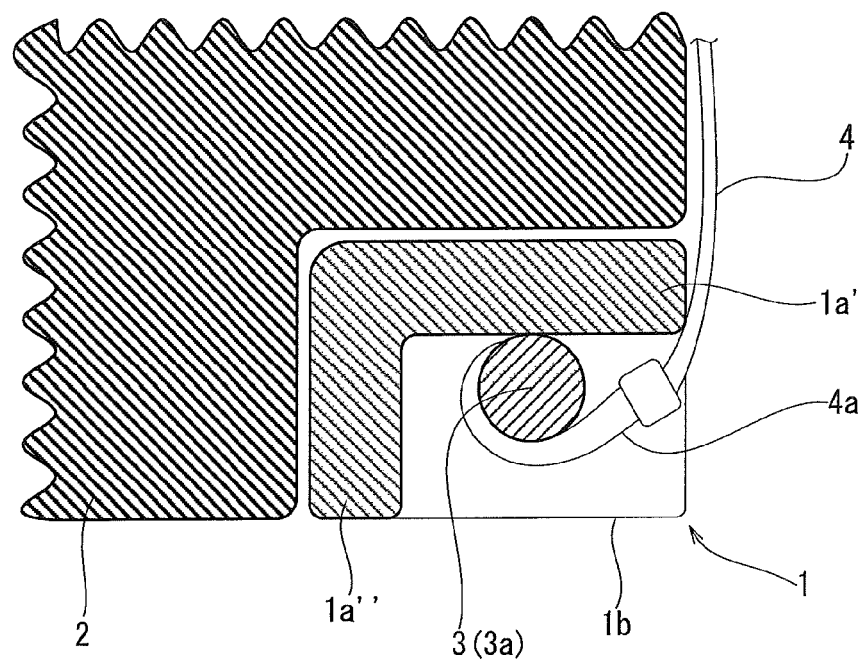

The protection portion 1a is located between the cushion material 2 and the frame member 3 of the formed vehicle seat. The protection portion 1a is formed to cover the coupling device 4a from at least two sides. Specifically, as shown in FIG. 5(b), the protection portion 1a includes an upper wall 1a' located above the frame member 3, and a side wall 1a" located closer to the cushion material 2 (closer to the lateral side) than the frame member 3. In this embodiment, the upper wall 1a' and the side wall 1a" each have a plate shape (specifically, a rectangular plate shape) extending along the frame member 3, and are coupled together at a substantially right angle to have an L-shape in cross section. With the protection member 1 attached to the frame member 3, the upper wall 1a' is held in contact with the frame member 3, and a gap is defined between the side wall 1a" and the frame member 3.

The attaching portion 1b is provided in plural to locate the coupling device 4a covered with the protection portions 1a therebetween in the formed vehicle seat. In this embodiment, a pair of the attaching portions 1b are provided at opposite ends of the protection portion 1a in a direction extending along the frame member 3. The pair of the attaching portions 1b each have a plate shape and are formed to be disposed at the opposite ends of the protection portion 1a to face each other.

The attaching portions 1b are formed to have a portion of the frame member 3 embedded therein with the protection member 1 attached to the frame member 3. Specifically, the frame member 3 is positioned extending through the attaching portions 1b.

According to the thus configured protection member 1, a space surrounded by the protection portion 1a and the pair of the attaching portions 1b opens toward the lateral side and the lower side of the formed vehicle seat. Whereby, when in forming a vehicle seat, the coupling devices 4a can be brought into coupling engagement with the frame member 3 from the opening side. Since the protection member 1 is located between the coupling devices 4a coupled to the frame member 3 and the cushion material 2, the coupling devices 4a are located away from the cushion material 2.

Figure 6:
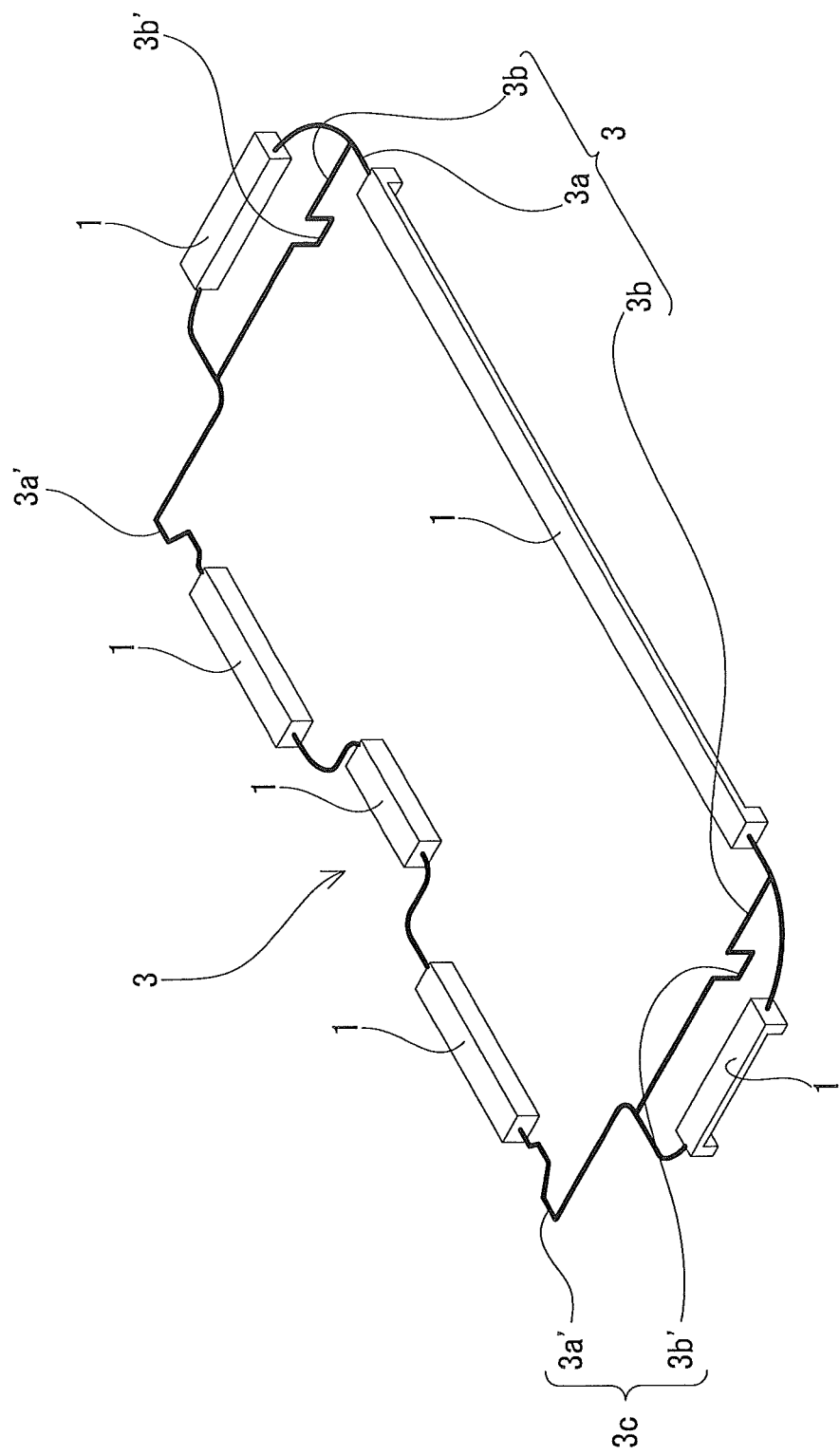
FIG. 6 is a perspective view showing a state in which the coupling device protection member of the first embodiment is held attached to a frame member.

As shown in FIG. 6, the protection member 1 is provided in plural to be attached to the peripheral frame 3a at different positions thereof. In this embodiment, they are attached to the peripheral frame 3a along its entire area. The protection members 1 are attached at positions corresponding to the coupling positions of the coupling devices 4a and the frame member 3. In this case, plural coupling devices 4a may be covered with a single protection member 1, or a single coupling device 4a may be covered with a single protection member 1. The length of each protection member 1 in the direction extending along the frame member 3 (hereinafter referred to a length) may be determined arbitrarily, such as according to the number of the coupling devices 4a to be covered.

As described above, the coupling device protection members 1 of this embodiment can protect the coupling devices 4a against contact with the cushion material 2.

Specifically, each protection member 1 protects the coupling device(s) 4a coupled to the frame member 3 by being attached to the frame member 3, and prevents or reduces occurrence of breakage of the coupling device(s) 4a due to contact of the coupling device(s) 4a with the cushion material 2 or occurrence of disengagement of the coupling device(s) 4a from the frame member 3.

With the protection portion 1a covering at least one coupling device 4a, it is possible to prevent breakage or disengagement of each coupling device 4a when the coupling devices 4a have been coupled to the frame member 3 at plural positions. Since the positions, at which the protection members 1 are attached, turn to be the coupling positions between the frame member 3 and the coupling devices 4a, the attaching positions of the coupling devices 4a can be easily figured out at the time of attaching the surface cover 4.

Since each coupling device 4a is covered by the protection portion 1a from at least two sides, it is possible to more securely prevent contact between the cushion material 2 and the coupling device 4a. With providing plural attaching portions 1b, the protection member 1 can be more securely held attached to the frame member 3. Since a portion of the frame member 3, on which the attaching portion 1b is formed, is not exposed to the outside, the frame member 3 can be protected against deformation or breakage due to contact of the frame member 3 with an external member or part.

With the frame member 3 embedded partially in the attaching portion 1b, the protection member 1 can be securely fixed to the frame member 3. Whereby, the protection member 1 can be prevented from being disengaged from between the cushion material 2 and the frame member 3, and the protection member 1 can be prevented from being displaced from the coupling position of the frame member 3 and the coupling device 4a. Since the protection member 1 is attached to the frame member 3 by the attaching portions 1b, the protection member 1 can be easily separated from the frame member 3 by removing only the attaching portions 1b. Whereby, separation can be easily made for each part or member, enabling recycling them in easy manner.

Since the protection member 1 is formed of a foamed resin molding having a higher compression strength than that of the cushion material 2, the protection member 1 is unlikely to be broken even when the cushion material 2 has been deformed into contact with the protection member 1, and hence the coupling device 4a can be kept covered with the protection member 1. Also, loads applied to the cushion material 2 can be supported by the protection member 1, as well.

Since the protection member 1 is coated with a material having slidability, friction caused at the time when the protection member 1 contacts a body of a vehicle or the frame member 3 and is in friction therewith can be reduced. Whereby, the protection member 1 can be prevented or suppressed from being broken due to friction. It is also possible to prevent abnormal noises caused due to contact and friction with a body of a vehicle or the frame member 3.

<Second Embodiment>

Figure 7:
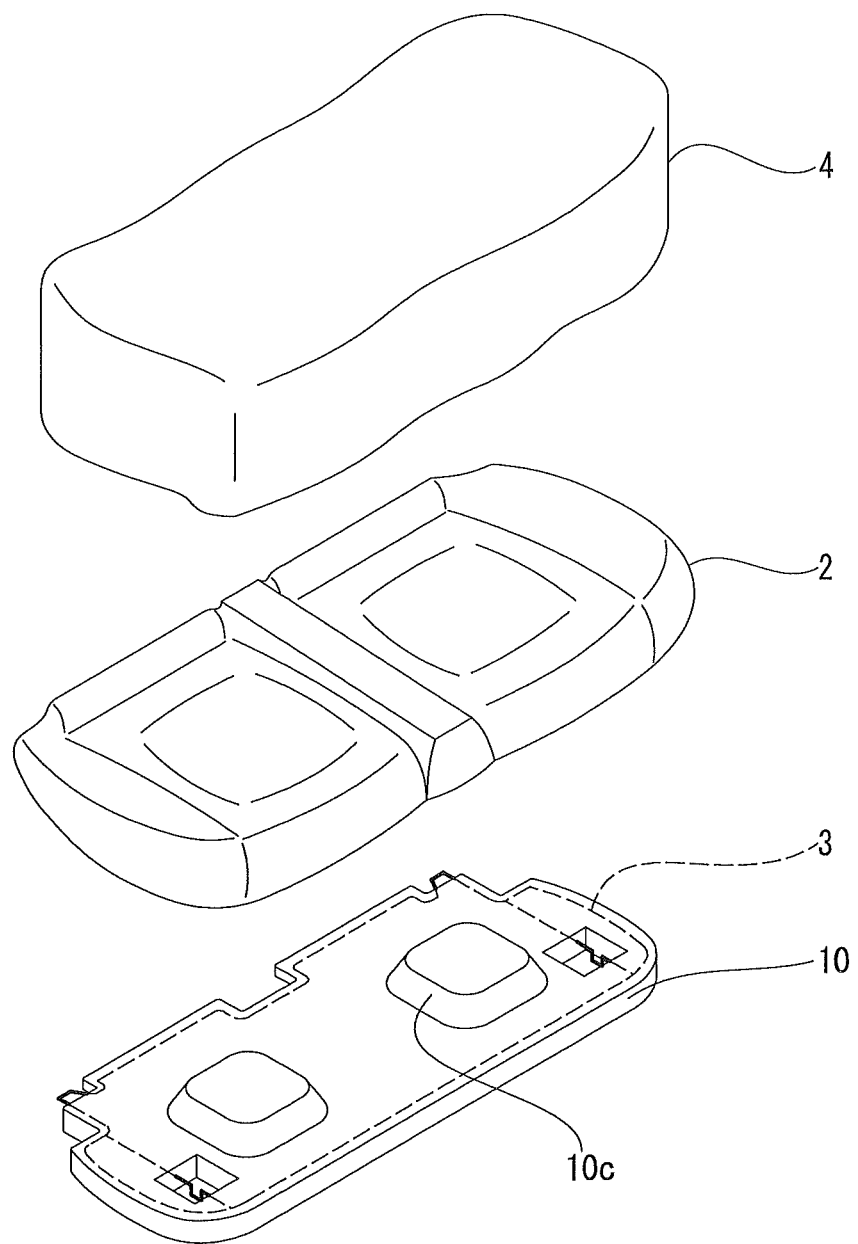
FIG. 7 is a perspective view showing a construction of a vehicle seat using a coupling device protection member of a second embodiment.
Figure 8:
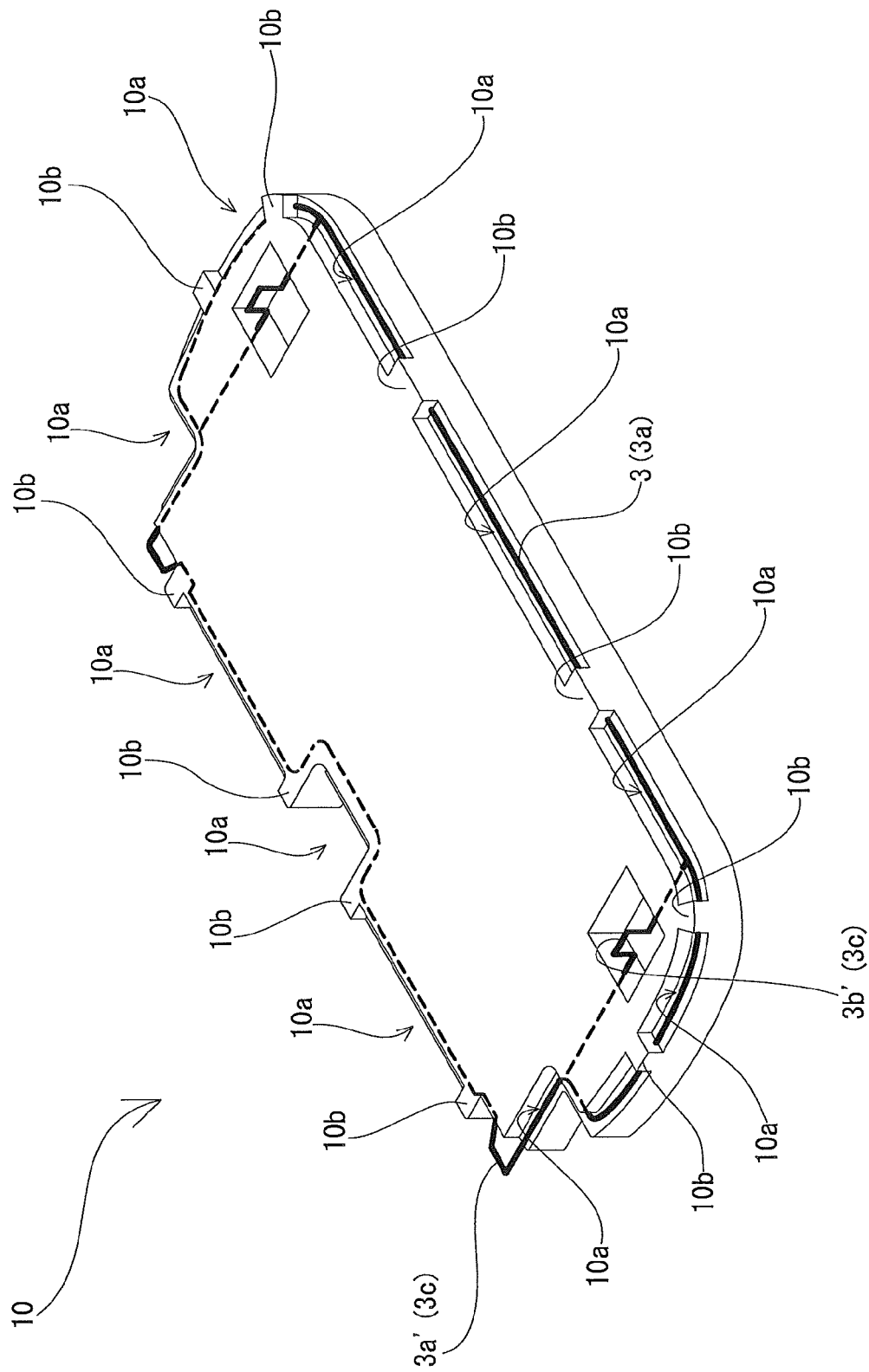
FIG. 8 is a perspective view showing a state in which the coupling device protection member of the second embodiment is held attached to a frame member.

Now, the description will be made for a second embodiment of the present invention with reference to FIGS. 7 and 8. Hereinafter, the description will be made mainly for different points or features from the first embodiment, while allocating the same reference numerals to the same parts or members so as to omit the description thereof.

A coupling device protection member (hereinafter referred to a protection member) 10 according to the second embodiment is configured to be able to mount the cushion material 2 thereon when a vehicle seat has been installed in a vehicle. Specifically, as shown in FIG. 7, the protection member 10 includes a surface (hereinafter referred to a top surface) configured to be able to mount the cushion material 2 thereon, and the top surface has a shape corresponding to a peripheral shape of the cushion material 2 in plan view. In this embodiment, the protection member 10 has a plate shape having a periphery extending along the peripheral shape of the cushion material 2 in plan view. The protection member 10 acts as a member for compensating for the height of the cushion material 2 when the cushion material 2 has been mounted on the top surface.

The protection member 10 is configured to partly fit into the cushion material 2. Specifically, the protection member 10 has a fitting portion 10c shaped to be able to fit into the cushion material 2. The top surface of the protection member 10 partially bulges to form the fitting portion 10c. In this embodiment, the fitting portion 10c is provided at two positions. Whereby, it is possible to prevent positional displacement occurred when the cushion material 2 has been mounted on the protection member 10.

Accordingly, the cushion material 2 is configured to fittingly receive a portion of the protection member 10. Specifically, the cushion material 2 has fitting recesses (not shown) in its contact surface (a surface facing the side on which a passenger sits) configured to be able to fittingly receive the fitting portions 10c. When the cushion material 2 has been mounted on the protection member 10, the fitting portions 10c fit into the fitting recesses.

The protection member 10 is formed so that, when it is mounted on the frame member 3, the frame member 3 (specifically, the peripheral frame 3a) is located along the periphery of the protection member 10 in plan view. In this embodiment, as shown in FIG. 8, the protection member 10 includes protection portions 10a formed by cutting out the protection member 10 to have a peripheral portion of the lower side facing the upper side formed into an L-shape in cross section. The protection portions 10a are formed along the periphery of the protection member 10 in plan view, and are configured to locate the peripheral frame 3a inside the protection portions 10a when the protection member 10 has been attached to the frame member 3.

The protection portions 10a are configured to open toward the lateral side and the lower side of the protection member 10 in plan view. Specifically, the protection portions 10a are configured to cover the coupling positions of the frame member 3 and the coupling devices 4a from at least two sides. The protection member 10 is held in a state to have the transverse frame 3b partly embedded therein, and has through-holes around the coupling projection 3b' to locate the coupling projections 3b' inside thereof.

The protection member 10 includes an attaching portion 10b that is to be attached to the frame member 3. The attaching portion 10b is formed to have the protection portions 10a partly embedded therein when the protection member 10 has been attached to the frame member 3. Specifically, at a position at which the attaching portion 10b is formed, the frame member 3 (specifically, the peripheral frame 3a) is embedded in the protection member 10. Whereby, the protection member 10 is fixed to the frame member 3.

The attaching portion 10b is provided in plural. Specifically, the attaching portions 10b are formed at plural positions at intervals along the periphery of the protection member 10 in plan view. In this embodiment, the attaching portions 10b are formed along a substantially entire area of the peripheral frame 3a at intervals. The attaching portions 10b are formed at such positions as to have at least one coupling position of the frame member 3 and the coupling device 4a located between the adjacent attaching portions 10b. Whereby, each coupling device 4a can be coupled to the peripheral frame 3a from the opening side of the protection portion 10a between the attaching portions 10b. The interval between the attaching portions 10b can be determined arbitrarily, such as according to the number of the coupling devices 4a covered by the protection member 10.

The thus configured protection member 10 is located between the coupling devices 4a coupled to the frame member 3 and the cushion material 2, so that the coupling devices 4a are located away from the cushion material 2.

According to the above configuration, since the protection member 10 is configured to be able to mount the cushion material 2 thereon, it is possible to protect the coupling devices 4a by the protection member 10, and use the protection member 10 as a member for compensating for the height of the cushion material 2. Since portions of the frame member 3, on which the attaching portions 10b are formed, are not exposed to the outside, the frame member 3 can be protected against deformation or breakage due to contact of the frame member 3 with an external member or part. Also, since the frame member 3 is substantially entirely located inside the protection portions 10a, the frame member 3 can be protected against deformation or breakage due to contact with the cushion material 2. Furthermore, since the peripheral frame 3a is located on the protection portions 10a formed along the periphery of the protection member 10, the frame member 3 can be reinforced and hence prevented from being deformed. Since the protection member 10 is attached to the frame member 3 by the attaching portions 10b, the protection member 1 can be easily separated from the frame member 3 by removing only the attaching portions 1b. Whereby, separation can be easily made for each part or member, enabling recycling them in easy manner.

<Third Embodiment>

Now, the description will be made for a third embodiment of the present invention with reference to FIGS. 9 and 10. A protection member 11 of the third embodiment is different from the protection member 10 of the second embodiment in that a protection member is made up of plural members or parts. Along with this difference, a frame member 30 has a different configuration. Thus, hereinafter, the description will be made mainly for different points or features from the second embodiment, while allocating the same reference numerals to the same parts or members so as to omit the description thereof.

Figure 9A:
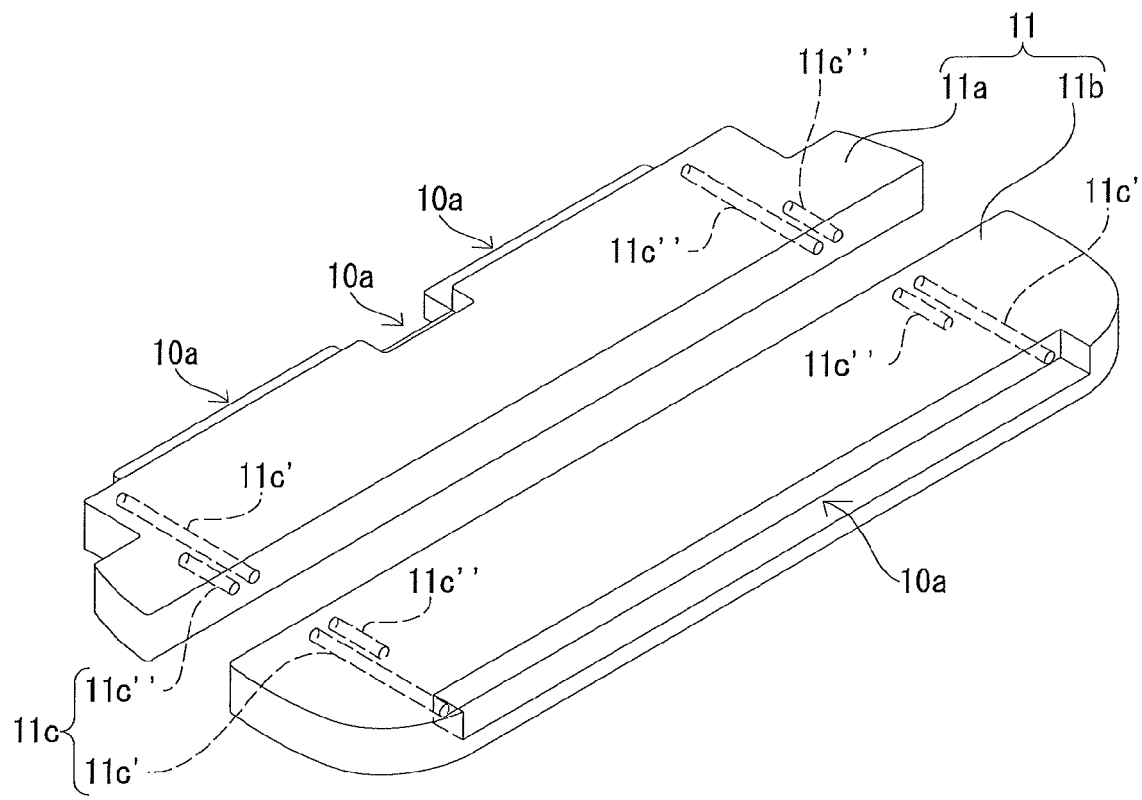
FIG. 9(*a*) is a perspective view showing a coupling device protection member of a third embodiment, and FIG. 9(*b*) is a perspective view showing a frame member for use in the third embodiment.
Figure 10:
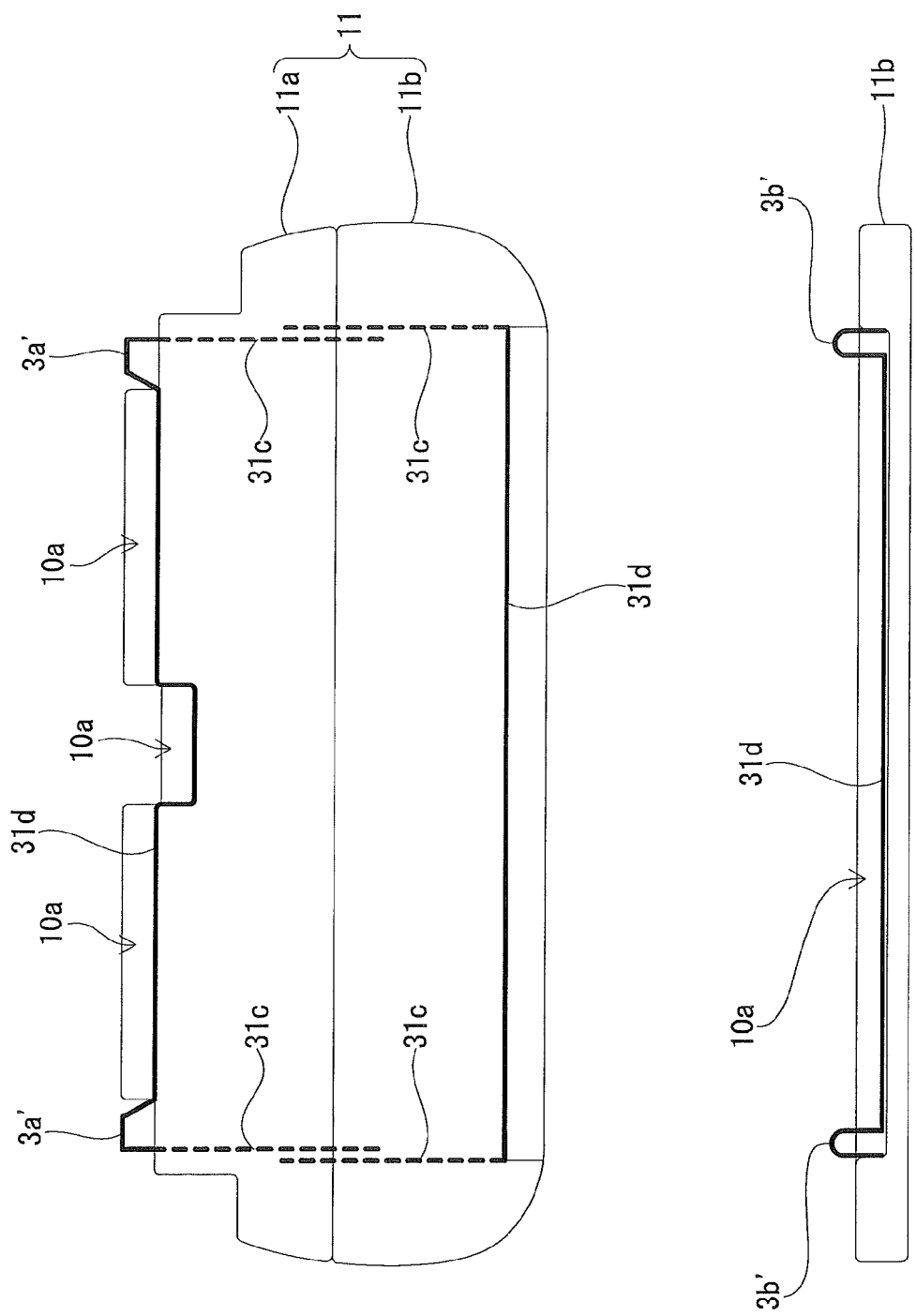
FIG. 10 is a plan view and a side view showing a state in which the coupling device protection member of the second embodiment is held attached to a frame member.

As shown in FIG. 9(a), the protection member 11 is made up of a pair of protection member pieces 11a, 11b that are coupled together by a hereinafter described frame member 31. The pair of protection member pieces 11a, 11b have shapes similar to pieces of the protection member 10 of the second embodiment divided in one direction (a lengthwise direction), and are configured to have substantially the same shape as the protection member 10 of the second embodiment by being coupled together.

The pair of protection member pieces 11a, 11b are configured to be coupled together by the frame member 31 while they are disposed in parallel to each other, the frame member 31 being inserted thereinto in a direction parallel to the disposed protection member pieces. Specifically, the pair of protection member pieces 11a, 11b have insertion holes 11c for insertion of the frame member 31 (hereinafter described first and second frame members 31a, 31b).

The insertion holes 11c include insertion-through-holes 11c', through which the protection member pieces 11a, 11b are inserted in an insertion direction of the frame member 31 and insertion-closed-holes 11c" that extend in the insertion direction of the frame member 31 from outer surfaces of the protection member pieces 11a, 11b with closed ends located inside the protection member pieces 11a, 11b. The protection member pieces 11a, 11b each have the insertion-through-hole 11c' and the insertion-closed-hole 11c". When the pair of protection member pieces 11a, 11b are disposed in parallel to each other, the insertion-through-hole 11c' of one protection member piece 11a or 11b is communicated to the insertion-closed-hole 1d" of the remaining protection member piece 11b or 11a to form a straight insertion hole 1d.

The protection member 11 has a pair of insertion holes 11c for insertion of the first frame member 31a and a pair of insertion holes 11c for insertion of the second frame member 31b. Each pair of insertion holes 11c are formed at opposite ends of the protection member 11 in a direction (a lengthwise direction) orthogonal to the insertion direction of the frame member 31.

The protection portions 10a are formed in the periphery of the protection member 11 in the lengthwise direction of the protection member 11. Specifically, the first protection member piece 11a has the protection portions 10a formed at three positions between the insertion-through-holes 11c'. The second protection member piece 11b has the protection portion 10a integrally formed between the insertion-through-holes 11c' to allow the insertion-through-holes 11c' to communicate to the inside the protection portion 10a.

Figure 9B:
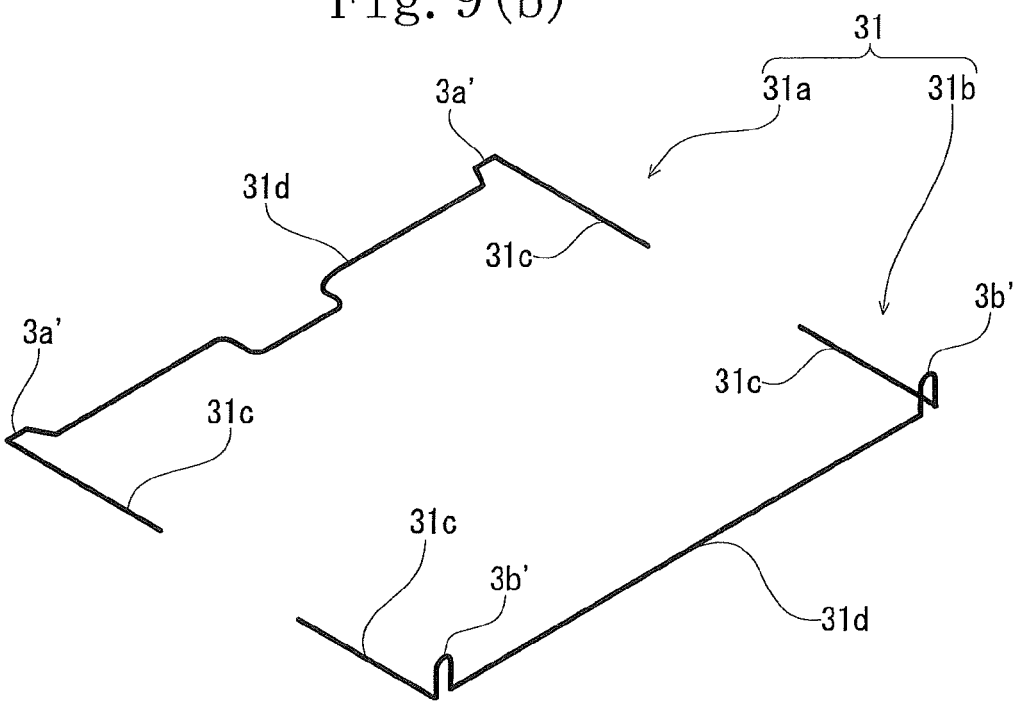

As shown in FIG. 9(b), the frame member 31 includes first and second frame members 31a, 31b. The first and second frame members 31a, 31b each are made up of a pair of insertion portions 31c to be inserted into the insertion holes 1d, and a peripheral frame 31d that connects between the pair of insertion portions 31c and are disposed along the periphery of the protection member 11.

The insertion portions 31c and the peripheral frame 31d have a rod shape and the insertion portions 31c extend orthogonal to the peripheral frame 31d. The outer coupling portions 3a' are provided at the opposite ends of the peripheral frame 31d of the first frame member 31a. The coupling projections 3b' are provided at the opposite ends of the peripheral frame 31d of the second frame member 31b.

Now, the description will be made for the state in which the protection member 11 has been formed. As shown in FIG. 10, the pair of protection member pieces 11a, 11b are disposed to have their lengthwise axes aligned parallel to each other and coupled together by the frame member 31 inserted into the insertion holes 1d. At this position, the peripheral frame 31d of the first or second frame member 31a, 31b is located inside the protection portion 10a of each of the protection member pieces 11a, 11b.

With the thus configured protection member 11, it is possible to shorten the molding time for molding each of the protection pieces 11a, 11b and hence increase the number of the protection members 11 manufactured per unit time, as compared with the integrally formed protection member. Since a molding die for molding each of the protection member pieces 11a, 11b can be reduced in size as compared with a molding die for integrally molding the protection member 11, plural molding dies can be installed in one molding machine. Thus, it is possible to increase the number of the protection members 11 manufactured per unit time.

When the protection member 11 is integrally formed with the frame member 31, it is not necessary to mold them with the frame member 31 partly embedded inside the protection member 11. Thus, the frame member 31 can be easily integrated to the protection member 11 by inserting the frame member 31 into the protection member 11. Furthermore, since the frame member 31 can be easily pulled out from the protection member 11, the protection member 11 and the frame member 31 can be easily separated from each other, which enables reduction of troublesome works for separate collection. Whereby, separation can be easily made for each part or member, enabling recycling them in easy manner.

Since portions of the frame member 31, at which the insertion holes 11c are formed, are not exposed to the outside, the frame member 31 can be protected against deformation or breakage due to contact of the frame member 31 with an external member or part. Also, since the portions of the frame member 31, which are exposed to the outside, are substantially entirely located inside the protection portions 10a, the frame member 31 can be protected against deformation or breakage due to contact with the cushion material 2.

The coupling device protection member of the present invention is not necessarily limited to the above embodiments and may be subjected to various modifications.

Figure 11A:
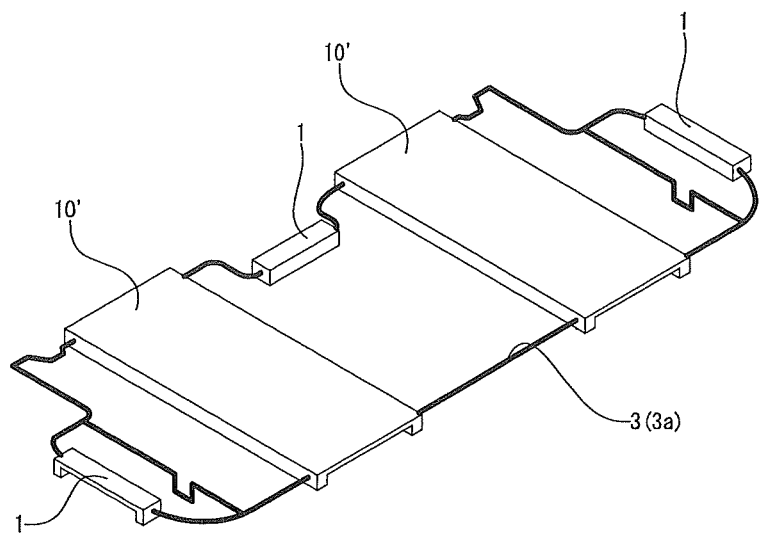
FIG. 11 is a perspective view showing a state in which a coupling device protection member of another embodiment is held attached to a frame member.
Figure 11B:
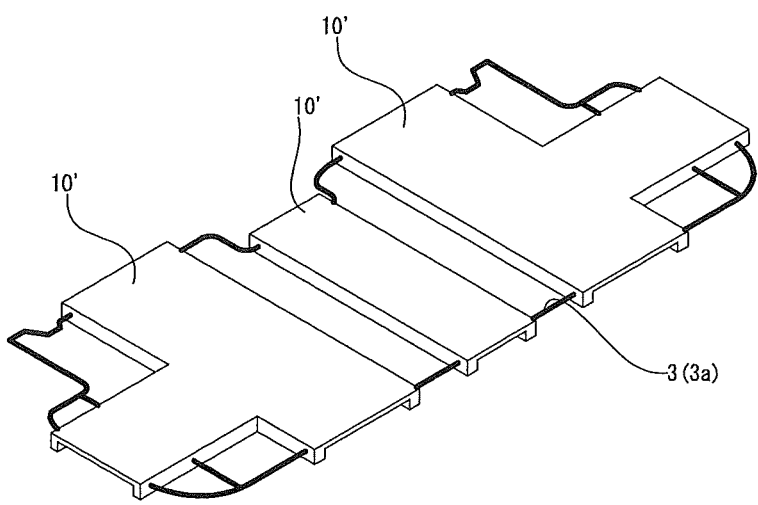

For example, in the first embodiment, the plural protection members 1 are attached along the peripheral frame 3a, but this is not essential. As shown in FIG. 11, plural protection members may be coupled together in an area inside the peripheral frame 3a to provide plural protection member pieces 10'. According to this configuration, a cushion material can be mounted on the protection member and these protection members may be used as members for compensating for the height of the cushion member. Since the area inside the peripheral frame 3a is partly embedded by the protection member pieces 10', it is possible to achieve weight reduction as compared with the case in which the area inside the peripheral frame 3a is entirely embedded as in the second embodiment.

Figure 12A:
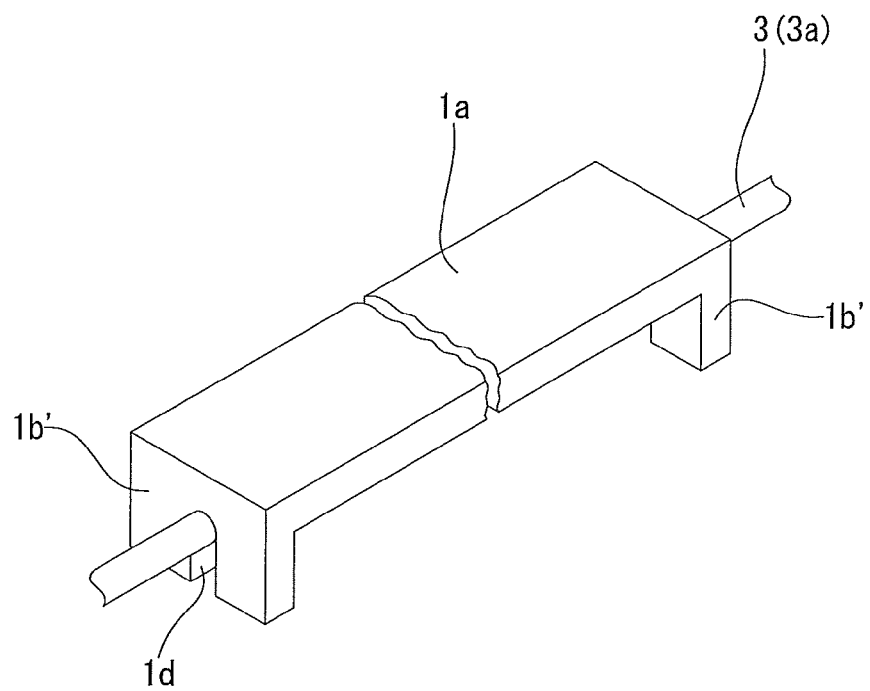
FIG. 12 is a perspective view showing a state in which a coupling device protection member of still another embodiment is held attached to a frame member.
Figure 12B:
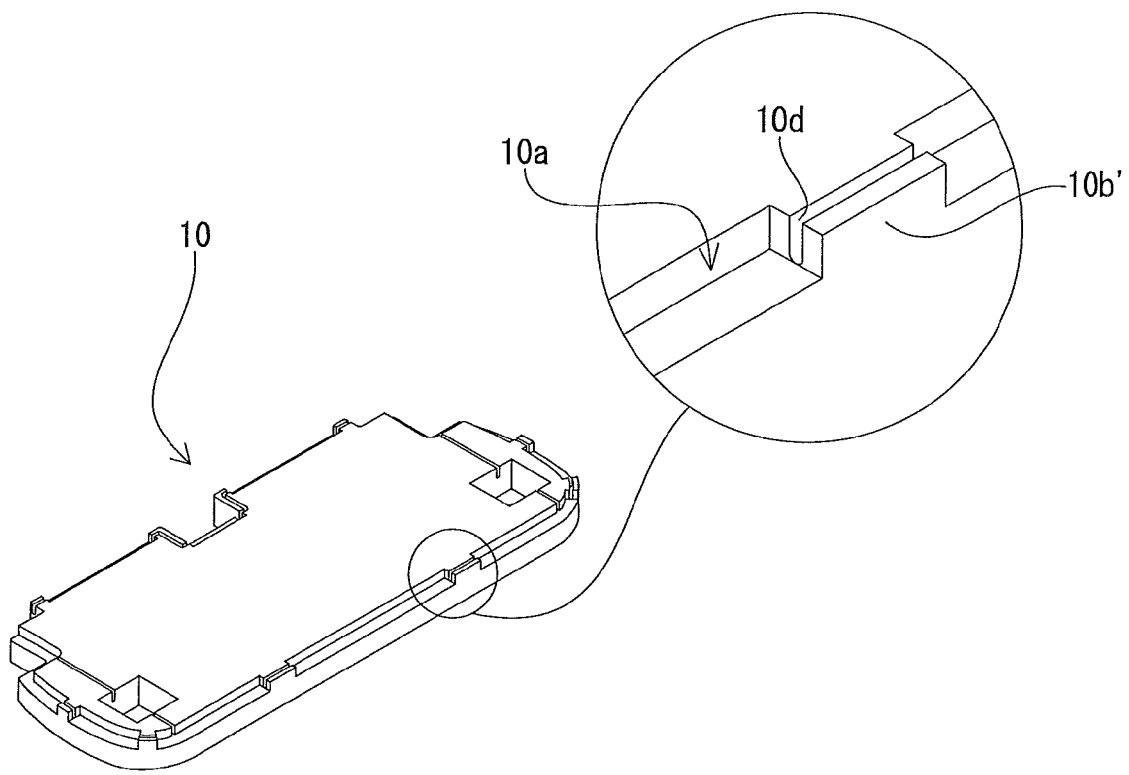

In the first and second embodiments, the frame member 3 is partly embedded in the protection member 1, 10 by the attaching portion 1b, 10b. This is not essential. As shown in FIG. 12, a groove 1d, 10d may be formed in an attaching portion to fittingly receive the frame member 3. According to this configuration, the protection member can be more easily separated from the frame member 3. Whereby, separation can be easily made for each part or member, enabling recycling them in easy manner.

In the above embodiments, the cushion material 2 and the protection member 1, 10 are stacked to each other upon fitting of the protection member 1, 10 into the cushion material 2. This is not essential. A cushion material and a protection member may be integrally formed together in stacked fashion, or a cushion material and a protection member, which are arranged in stacked fashion, may be fixed together by using an adhesive or the like.

In the above embodiments, the protection member 1, 10 is attached to the frame member 3 by the attaching portion 1b, 10b. This is not essential. For example, in the first embodiment, only the protection portion 1a may be disposed between the cushion material 2 and the frame member 3 without providing the attaching portions 1b. Furthermore, in the second embodiment, the frame member 3 may be disposed on the protection portions 10a without providing the attaching portions 10b.

Description of Reference Numerals 1, 10, 11: coupling device protection member, 1a, 10a: protection portion, 1b, 10b: attaching portion, 2: cushion material, 3, 31: frame member, 3a: peripheral frame, 3a': outer coupling portion, 3b: transverse frame, 3b': coupling projection, 3c: frame coupling portion, 4: surface cover, 4a: coupling device

The invention claimed is:

1. A coupling device protection member for use in a vehicle seat that includes a cushion material that is elastically deformed by loads, a frame member that is stacked to the cushion material to reinforce the cushion material, and a surface cover that covers at least the cushion material, the surface cover being coupled to the frame member via a coupling device, the coupling device protection member comprising:

a protection portion located between the frame member and the cushion member, and a pair of attaching portions attached to the frame member, the protection portion comprising a side wall located on the lateral side of the frame member and between the frame member and the cushion member, wherein the coupling device protection member is attached to the frame material so as to protect the coupling device coupled to the frame member.

2. The coupling device protection member according to claim 1, wherein the protection portion is formed to cover at least one of the coupling devices coupled to the frame member from at least two sides, the attaching portion are provided in plural to locate the at least one of the coupling devices covered by the protection portion between the attaching portions, and the protection portion and the plural attaching portions are formed integrally with each other.

3. The coupling device protection member according to claim 2, comprising a foamed resin molding that has a higher compression strength than that of the cushion material.

4. The coupling device protection member according to claim 2, which is coated with a material that has slidability.

5. The coupling device protection member according to claim 2, which is configured to be releasable from a state in which the coupling device protection member is held attached to the frame member.

6. The coupling device protection member according to claim 2, wherein the vehicle seat includes a plurality of frame members.

7. A vehicle seat comprising: a cushion material that is elastically deformed by loads; a frame member that is stacked to the cushion material to reinforce the cushion material; a surface cover that covers at least the cushion material, the surface cover being coupled to the frame member via a coupling device, and at least one coupling device protection member of claim 2.

8. The coupling device protection member according to claim 1, comprising a foamed resin molding that has a higher compression strength than that of the cushion material.

9. The coupling device protection member according to claim 1, which is coated with a material that has slidability.

10. The coupling device protection member according to claim 1, which is configured to be releasable from a state in which the coupling device protection member is held attached to the frame member.

11. The coupling device protection member according to claim 1, wherein the vehicle seat includes a plurality of frame members.

12. A vehicle seat comprising: a cushion material that is elastically deformed by loads; a frame member that is stacked to the cushion material to reinforce the cushion material; a surface cover that covers at least the cushion material, the surface cover being coupled to the frame member via a coupling device, and at least one coupling device protection member of claim 1.

13. The vehicle seat according to claim 12, wherein the coupling device protection member is fixed to the frame member.

* * * * *